United States Patent
Yerli

(10) Patent No.: US 9,344,753 B2
(45) Date of Patent: May 17, 2016

(54) MOBILE INPUT AND SENSOR DEVICE FOR A COMPUTER-CONTROLLED VIDEO ENTERTAINMENT SYSTEM

(75) Inventor: Cevat Yerli, Frankfurt (DE)

(73) Assignee: Crytek GmbH, Frankfurt am Main (DE)

( * ) Notice: Subject to any disclaimer, the term of this patent is extended or adjusted under 35 U.S.C. 154(b) by 394 days.

(21) Appl. No.: 12/974,029

(22) Filed: Dec. 21, 2010

(65) Prior Publication Data
US 2011/0159962 A1  Jun. 30, 2011

Related U.S. Application Data

(60) Provisional application No. 61/291,032, filed on Dec. 30, 2009.

(51) Int. Cl.
*H04M 1/00* (2006.01)
*H04B 1/38* (2015.01)
(Continued)

(52) U.S. Cl.
CPC .......... *H04N 21/42221* (2013.01); *A63F 13/06* (2013.01); *A63F 13/12* (2013.01); *H04N 21/42222* (2013.01); *A63F 2300/1075* (2013.01); *A63F 2300/1081* (2013.01);
(Continued)

(58) Field of Classification Search
CPC . A63F 13/06; A63F 13/12; A63F 2300/1075; A63F 2300/1081; A63F 2300/1093; A63F 2300/406; A63F 2300/407; A63F 2300/538; A63F 2300/6072; H04N 21/42221; H04N 21/41222
USPC ............... 455/411, 556.1, 566, 234; 715/863, 715/758, 701, 702, 753
See application file for complete search history.

(56) References Cited

U.S. PATENT DOCUMENTS 5,801,754 A     9/1998  Ruybal et al.
7,647,560 B2 *  1/2010  Macauley et al. ............. 715/758
(Continued)

FOREIGN PATENT DOCUMENTS

WO       0124473       4/2001
WO       2008069519    6/2008

OTHER PUBLICATIONS

European Search Report for corresponding Application No. 10 196 839.4 dated Apr. 4, 2011.
(Continued)

*Primary Examiner* — Ping Hsieh
*Assistant Examiner* — Xin Jia
(74) *Attorney, Agent, or Firm* — Christensen O'Connor Johnson Kindness PLLC

(57) ABSTRACT

Mobile input and sensor device for a computer-controlled video entertainment system, in particular a mobile input and sensor device providing user-related input data to said system. This provides an easy-to-handle mobile input and sensor device having direct access to an IP-based network, for transmitting sensor signals or data derived thereof as user-related input data via the IP-based network to a remote computing device or server, preferably to a cloud of servers, which then process these input data for controlling the running entertainment program. The mobile input and sensor device can be made simple, since it is designed to detect user activities and to generate sensor signals which are transmitted as input data to the remote computer(s) or server(s). The mobile input and sensor device directly communicates with any IP-based computing device (gaming server or the like) installed remotely and having powerful hardware and software to process the received input data.

27 Claims, 3 Drawing Sheets

(51) Int. Cl.
*H04N 21/422* (2011.01)
*A63F 13/20* (2014.01)
*A63F 13/30* (2014.01)

(52) U.S. Cl.
CPC .. *A63F 2300/1093* (2013.01); *A63F 2300/406* (2013.01); *A63F 2300/407* (2013.01); *A63F 2300/538* (2013.01); *A63F 2300/6072* (2013.01)

(56) References Cited

U.S. PATENT DOCUMENTS

| | | | |
|---|---|---|---|
| 2006/0230073 A1* | 10/2006 | Gopalakrishnan | 707/104.1 |
| 2008/0039202 A1 | 2/2008 | Sawano et al. | |
| 2008/0273755 A1 | 11/2008 | Hildreth | |
| 2009/0227232 A1* | 9/2009 | Matas et al. | 455/411 |
| 2009/0327888 A1* | 12/2009 | Woolf et al. | 715/704 |
| 2010/0053591 A1* | 3/2010 | Gibson et al. | 356/3.09 |
| 2011/0084795 A1* | 4/2011 | Fukuyori | 340/3.1 |
| 2011/0154266 A1* | 6/2011 | Friend et al. | 715/863 |

OTHER PUBLICATIONS

Nintendo DSi; Dec. 27, 2009, XP002631195, Retrieved from the Internet: URL:http://en.wikipedia.org/w/index.php?title=Nintendo DSi&oldid=334174919 [European Search Report copy retrieved on Apr. 4, 2011. Submitted copy retrieved Aug. 30, 2011].

* cited by examiner

MOBILE INPUT AND SENSOR DEVICE FOR A COMPUTER-CONTROLLED VIDEO ENTERTAINMENT SYSTEM

The present application is related to and claims benefit under 35 U.S.C. §119(e) of U.S. Provisional Application No. 61/291,032, filed Dec. 30, 2009, the entirety of which is hereby incorporated herein by reference.

FIELD OF THE INVENTION

The present invention relates to a mobile input and sensor device providing user-related sensor signals and input to a computer-controlled video entertainment system. In particular the invention relates to a mobile input and sensor device for a computer-controlled gaming system to be used by at least one user wherein the mobile input and sensor device can detect natural input such as physical gestures or speech. The invention further relates to a mobile input and sensor device to be applied to a system for providing multimedia data for entertaining presentations to a plurality of user (audience) at home or outside in cinemas, theater rooms or the like. In this respect the present invention particularly relates to mobile input and sensor devices for a system providing computer-based entertainment, like interactive video games or performing interactive movies or shows (so-called theater games) and interactive advertisement games.

BACKGROUND OF INVENTION

Entertainment systems, such as video game systems or devices are well-known and are usually implemented by personal computers (PC) or game consoles which are controlled by at least one user. For controlling these systems the user is equipped with an input control device, such as a gamepad, joystick or mouse, which is linked to the PC or game console by cable. Modern game consoles provide wireless control in that the users are equipped with wireless control devices. The user activity is detected by a sensor device which usually comprises infrared sensing elements. These sensor devices have to be installed in the vicinity of the display device (TV set or monitor) and close to the user's position.

In US 2008/0039202 A1 such a game console with wireless sensor device is disclosed. The sensor device is linked via a cable to the game console which receives the sensor signals and processes these signals as input data for the running game. This means that the input signal and data processing is solely performed by said console, in particular by the processing unit of it. Thus the processing of the sensor signals depends on the layout and design of the processing unit which can have the effect that only a limited number of user control devices can be used. Therefore the system is not designed to be controlled by a large number of users or even by an audience. Moreover, the sensor device is exclusively designed to only work with said console. Thus there are still sensor devices cannot be used to operate with different systems. Finally, each user is equipped with a control device (wireless gamepad) which still has to be touched. But it would be desirable also to provide a contactless or touch-free control as well.

Beside these drawbacks there are further deficiencies to be mentioned here:

In present systems, the computing, such as rendering, is performed by the processor of the used personal computer or game console. Consequently any update of hardware or software has to be made locally and involves high costs. Since many producers of consoles even keep the hardware and software protected, the users are forced to wait for new releases and have to buy them from the producers. In cinema gaming systems the hardware and software is normally implemented by a computer or server which is installed at the cinema or theater. Consequently a high invest has to be made at each cinema and any updating has to be made on site. This makes it harder and costly to frequently update or upgrade the systems and thus to stay in line with the developing technology of rendering computer graphics and movies. Moreover the known systems are not prepared to provide touch-free control equipment.

SUMMARY OF INVENTION

According to a first aspect of the present invention there is provided a mobile input and sensor device for a computer-controlled video entertainment system comprising a display device for displaying video entertainment pictures to at least one user; at least one computing device executing an entertainment software application for providing output data to be transmitted to said the display device to display the video entertainment pictures; wherein
  the mobile input and sensor device is held by the at least one user in front of said display device and/or said computing device for providing user-related input data to be processed by said entertainment software application, and wherein the mobile input and sensor device comprises at least one optical sensory element being directed towards the user and at least one input element and further comprises at least one wireless interface for transmitting input data to said at least one computing device.

The invention also provides a mobile communications and/or entertainment device comprising a mobile input and sensor device for a computer-controlled video entertainment system and comprising a display device for displaying video entertainment pictures to at least one user; the system comprising at least one computing device executing an entertainment software application for providing output data to be transmitted to said the display device to display the video entertainment pictures; wherein
  the mobile input and sensor device comprises a touch panel being integrated in said display device for providing user-related input data to be processed by said entertainment software application, and wherein the mobile input and sensor device comprises at least one optical sensory element being directed towards the user and at least one input element and further comprises at least one wireless interface for transmitting input data to said at least one computing device.

Thus the invention provides a mobile input and sensor device for rich input, representing user control input, to be processed by at least on computing device, such as a console or remote server or even a server cloud which then provides entertainment output to at least one display device.

The invention also provides a computer-controlled video entertainment system, the system comprising:
  a display device for displaying video entertainment pictures to at least one user;
  at least one computing device being installed remotely from said display device and executing an entertainment software application for providing output data to be transmitted via an IP-based network to said the display device to display the video entertainment pictures;
  a mobile input and sensor device comprising at least one optical sensory element being directed towards the user and at least one input element and further comprising at least one wireless interface for transmitting input data to said at least one computing device.

Thus the invention provides an easy-to-handle mobile input and sensor device which can be wirelessly connected to at least one (local or remote) computing device and which can be installed near to or even within the display device and/or said computing device to detect user activities as rich inputs (gestures, speech, sound etc.) for the processed entertainment application.

Instead of being installed at or within a local computing device (e.g. a game console), the mobile input and sensor device is held by the user in front of a display device and be wirelessly linked to a remote computing server or to a cloud of several servers by having direct access to an IP-based network, in particular to the Internet, for transmitting sensor signals or data derived thereof as user-related input data via the IP-based network to a remote computing device or server, preferably to a cloud of servers, which then process these input data for controlling the running entertainment program. The effort for realizing said mobile input and sensor device in terms of hardware and software can be kept very low. The mobile input and sensor device can be made simple, since it is mainly designed to detect user activities and to generate sensor signals which are directly transmitted as input data to the remote computer(s) or server(s). Because of the fact that the mobile input and sensor device can directly be connected to the IP-based network (e.g. Internet) it can directly communicate with any IP-based computing device (gaming server or the like) being installed remotely and having powerful hardware and software to process the received input data. Thus there is no need to have a computer or game console being installed at the location of the user(s). Moreover, the users even do not need to have more than a mobile input and sensor device and a display device (TV set or monitor) when they want to enjoy and participate in an entertainment program. The entertainment or gaming program as such is remotely processed by said remote computer(s) under control of said input data. The computer(s) provide(s) output data (in particular video and audio) which are transmitted via the IP-based network back to the location of the user(s) and are then output by the display device (TV set, monitor) being connected to said IP-based network. This means that the users just need to have installed at their location (at home, in a cinema . . . ) a display device which is connected to the Internet and just need to have said mobile input and sensor device which is wirelessly connected to the Internet so that both devices can communicate with the remote computer(s) which run(s) the entertainment program. In a preferred embodiment there a several remote gaming computers which form a so-called server cloud. Thus many display devices and sensor devices (i.e. many homes or cinemas) can use the processing power of this server cloud. The installation costs for each user is therefore very low. Moreover, any software updating and/or hardware upgrading only needs to be made on this central server(s). The users need not to take care of updating and/or upgrading, but can always profit from the latest technology.

Moreover, the mobile input and sensor device can be integrated together with a display device into any mobile device for providing entertainment to the user.

Thus the invention allows at least one user (player, consumer) to interactively play high-definition entertainment programs, such as games and television shows, using touch-free natural inputs, such as physical gestures and speech. With this invention, there is no need to use a handheld controller device for input (such as a keyboard, game controller, or remote control) or to purchase and install expensive additional hardware such as a game console or computer. Of course there is the option to still have handheld controllers which communicate with the sensor device, if this device is equipped with appropriate hard- and software. The invention is preferably realized as a server (cloud)-based entertainment system. The system mainly consists of a mobile input and sensor device (which basically is sensor detecting and signal transmitting hardware) and a remote cloud computing and storage infrastructure.

In further embodiments of the invention the mobile input and sensor device comprises a sensor module with at least one sensory element for detecting user activities, in particular natural user inputs such as physical gestures and/or speech, and for producing sensor signals. The mobile input and sensor device may further comprise a processing unit for pre-processing said sensor signals to generate said user-related input data representing said detected user activities. The at least one sensor element can be an optical sensor for detecting physical gestures or appearance, an acoustical sensor for detecting user-produced speech, sound or noise and/or a thermal sensor for detecting physical presence or temperature.

In one embodiment the processing unit provides said user-related input data to said wireless network interface for being transmitted via said IP-based network to the at least one computing device.

In another embodiment the processing unit receives from the sensor elements the sensor signals and pre-processes these signals to generate the input data, in particular by applying signal and/or data recognition to generate input data which represent recognized user-related input patterns, in particular gestures and/or speech commands. With respect to this, the processing unit may be part of the computing device and receive sensor signals from many mobile input and sensor devices which relate to a plurality of users to process these signals and thus to generate collective input data, in particular by applying signal and/or data recognition to generate collective input data which represent recognized multi-user or user-group-related input patterns, in particular collective gestures and/or collective speech commands.

In a further embodiment the mobile input and sensor device can be integrated in a mobile communications and/or entertainment device comprising a visual output or projection module, in particular a laser-based projection module, to output visual effects and/or information (as a feedback from the game server) to said at least one user. The mobile input and sensor device may further comprise a wireless interface/networking module to receive further input data from external user input devices, in particular form gamepads, joysticks, keypads, keyboards.

In one of the embodiments of the invention the system is a home environment gaming system. In another embodiment the system is theater gaming system and the method of providing the data also comprises the step of controlling a display device by the output data to present images, movies, advertisements and/or games to the at least one audience. The method can also comprise the step of receiving input data or signals from the at least one audience before providing the content data by at least one content server, wherein the content data is selected from a database in dependence of the input data or signals. The input data may come from the gamepads being installed at the seats for the audience. The method may also comprise the steps of: receiving input data or signals from the at least one audience before or during the presentation of images, movies, advertisements and/or games, wherein presentation of images, movies, advertisements and/or games audience is displayed in dependence of the input data or signals.

BRIEF DESCRIPTION OF THE DRAWINGS

Further features and advantages of the present invention, as well as the structure and operation of various illustrative embodiments of the present invention, are described in more detail below with reference to the accompanying schematic drawings, wherein.

DETAILED DESCRIPTION OF PREFERRED EMBODIMENTS

Figure 1:
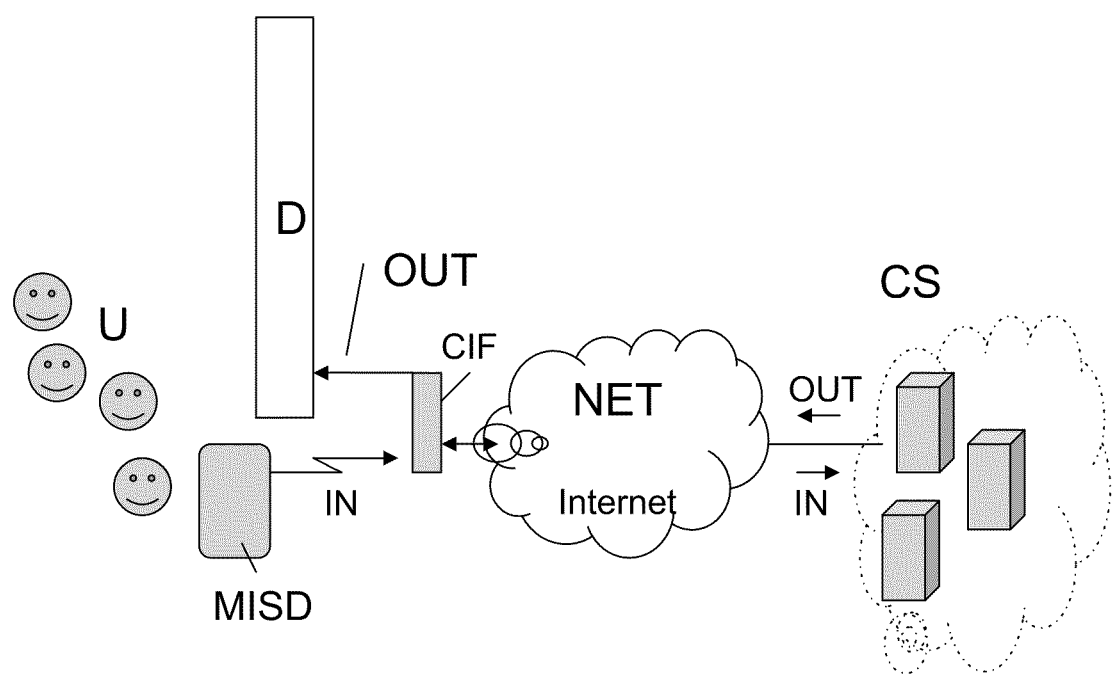
FIG. 1 shows the architecture of a computer-controlled video entertainment system of the invention.

In FIG. 1 there is shown the architecture of a computer-controlled video entertainment system of the invention, the system being implemented as a multi-user gaming system for providing entertainment to a plurality of users U, such as members of a family at home or the members of an audience in a cinema or theatre.

At the users' site there is installed a display device D which can be e.g., a flat panel LCD or a video projection screen, and for each user a mobile input and sensor device MISD, both devices being linked via an access interface to an IP-based network which is constituted by the Internet. Thus the display device D can receive output data OUT (video, audio) from (a) remote computing device(s) CS to be presented to the users U. The mobile input and sensor device MISD detects user activities to provide and transmit user-related input data IN via the Internet to said remote computing device(s) CS. In the shown embodiment there are several computing devices in form of a cluster or cloud of data processing servers which run the gaming program under control of said user-related input IN.

Since the cloud of servers CS is a very powerful processing resource which can quite easily be extended, the system can provide entertainment to a large number of users (hundreds, thousands or even much more) and/or to a plurality of locations (homes, cinemas, theatres ... ). Thus many single users and/or a variety of audiences can be provided with entertainment services. To simplify the explanation of the invention the configuration as shown in FIG. 1 relates to a single audience of users U.

Figure 2:
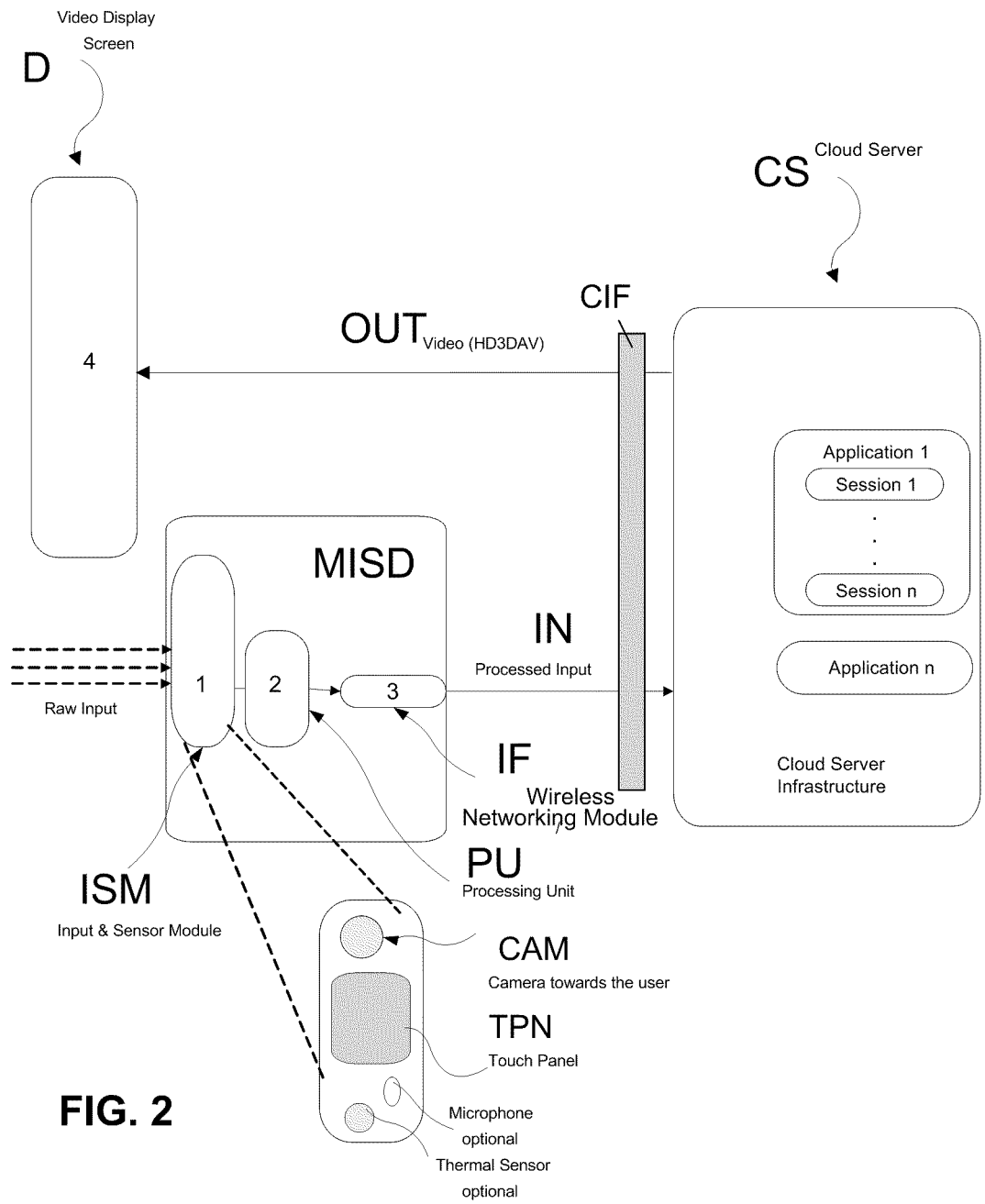
FIG. 2 shows a first embodiment of a mobile input and sensor device of the invention being connected with the remote cloud server(s) of the system.
Figure 3:
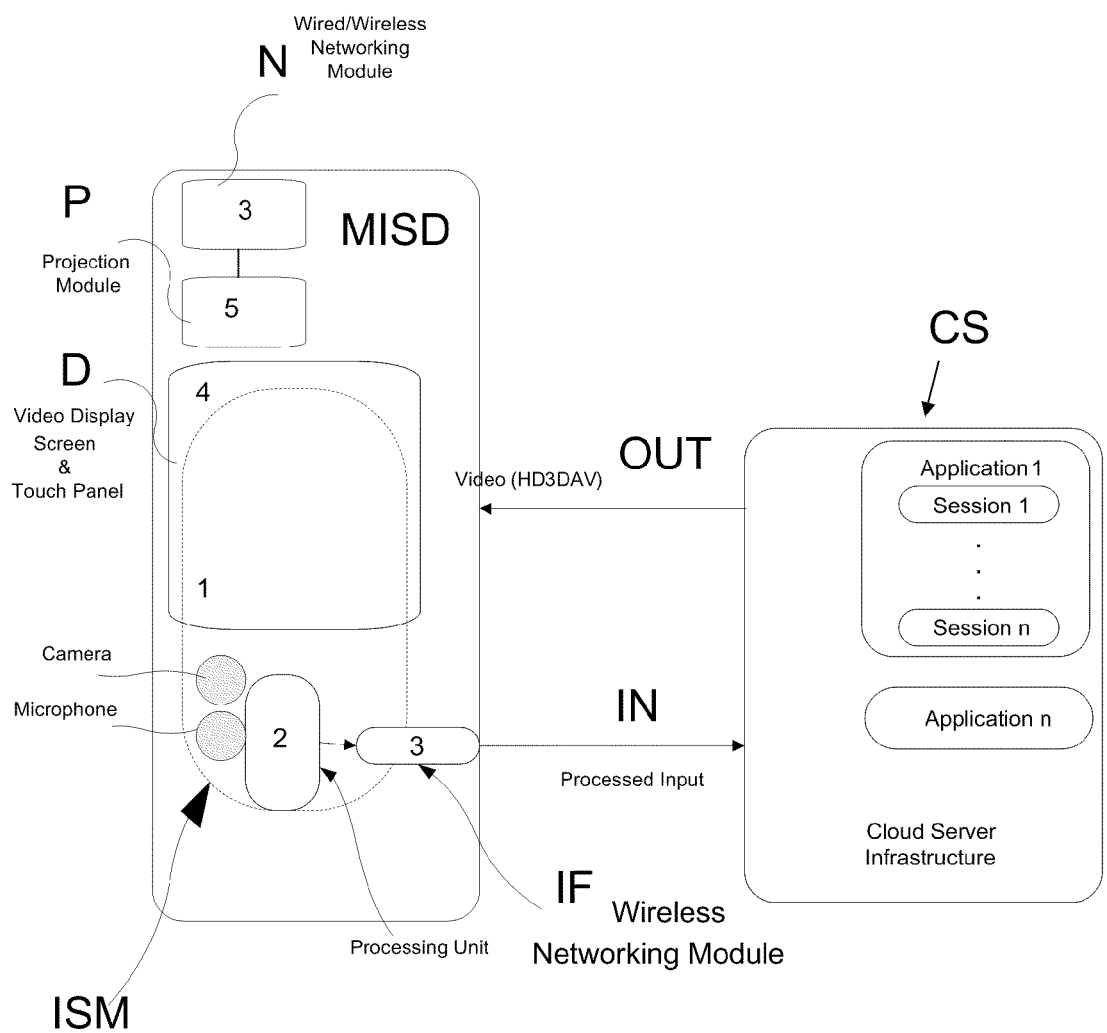
FIG. 3 shows a second embodiment of a mobile input and sensor device of the invention being integrated into a mobile communications device.

In FIGS. 2 and 3 different embodiments of a mobile input and sensor device MISD for detecting user activities and for providing user-related input data IN are shown.

As a first embodiment FIG. 2 shows a mobile input and sensor device MISD comprising an input and sensor module ISM having at least one sensor element, namely a camera CAM directed towards the user to detect user movements, physical gestures or the like. Further to this the mobile input and sensor device has a touch panel TPN for receiving manual inputs from the user, a microphone MIC for sensing audio and a thermal sensor for detecting the physical presence or condition of the user(s) by detecting the body temperature(s). The mobile input and sensor device MISD is held by the user in the vicinity of the display device D and near the user's face to detect his/her activities. The mobile input and sensor device MISD further comprises a processing unit PU which can be implemented by a low-cost microprocessor to receive the sensor signals from the sensor elements CAM and MIC and to generate user-related input data IN which shall be transmitted to the remote cloud servers CS, one of which is shown in FIG. 2. In order to transmit the input data IN via an IP-based network (see FIG. 1) the mobile input and sensor device MISD also comprises an interface IF in form of a networking module which can be implemented by a wireless Internet access module.

Thus the mobile input and sensor device SD as shown in FIG. 2 can be realized as an universal and low-cost mobile input and sensor device performing an touch-less (optical, acoustical, thermal) and a touch-sensed (touchpad or panel) detection to provide (in uplink direction) user-related input data IN to any remote computer or server CS which runs a entertainment or gaming program. The at least one server CS then produces output data OUT to be transmitted (in downlink direction) back to the users' location for being output at the display device D. The display device D may have its own interface for IP network access or may use the same access interface as common interface CIF to the Internet (also see FIG. 1).

In FIG. 3 a second embodiment of the invention is shown wherein the mobile input and sensor device MISD is integrated into a mobile consumer device for providing entertaining output to the user(s). The mobile input and sensor device MISD can also be wirelessly connected to a game console or any other computing device. In FIG. 3 the mobile consumer device MCD further comprises a projection module P for presenting visual output to the users such as laser beams to project feedback from the game server(s) CS. Further to this there is a wireless network module N for receiving further input data from external user control devices such as keypads, gamepads, joysticks or the like. These data are then also transmitted via the interface module IF to the remote server(s) CS. As shown in FIG. 3 the mobile input and sensor device SD and the display device D can be integrated in the same housing. This means that e.g. the mobile input and sensor device SD can be part of any mobile user device being equipped with an IP interface to be connected with a remote IP-based entertainment service provided by the servers CS. Thus the user(s) only need(s) to set up a single device and can instantly profit from the latest technology since all updates/upgrades are made at the remote site, i.e. on the servers CS.

In particular the mobile input and sensor device SD is integrated into a mobile consumer device MCD, such as a mobile phone or personal assistant having a display D.

By comparing FIGS. 2 and 3 it is clear that the mobile input and sensor device SD can be a separate unit from the display screen or can be wholly integrated with the display screen in one mobile consumer device MCD to form a single unit. As shown in all the FIGs the sensor module SM can comprise multiple types of sensory elements. The preferred sensory elements are optical sensors, in particular two or more cameras, and at least one acoustical sensors such as microphones. Option sensory elements can also be incorporated, such as a thermal sensor.

By this design rich input data IN which relate to the detected user activities are provided to control the system and to enable the user(s) to interact with the entertainment program running on the remote server(s) CS. The user's raw unprocessed input (natural input such as a gesture) is detected by the sensor module SM. A plurality of input streams can be delivered by each user, either simultaneously or sequentially. The input streams detected by the sensor module SM can be passive or active. This means that the active input streams are generated through explicit actions by the user. These actions can consist of speech and physical gestures, for example. The passive input streams can consist of the user's physical appearance (e.g. height or facial features), thermal signature (e.g. body temperature), and other data.

All of the raw inputs are converted into user-related input data IN. These data can be pre-processed, e.g. by applying pattern recognition to detect specific gestures, speech or the like. The pre-processing stage can occur locally on the user's site, i.e. in the mobile input and sensor device SD, or can occur remotely on the cloud computing infrastructure CS. During the pre-processing stage, various parameters such as position, timing, and user differentiation are resolved for each discrete input.

As shown in FIG. 3 by network module N the mobile input and sensor device can also receive further input data from external devices. This means that the user may also use an external input device such as a keyboard. Then the data input streams from such external devices would be received by the module N and could be combined and processed with the raw input streams detected by the sensor module SM. The combined and processed input could then be transmitted over the high-speed IP based data network NET to the cloud infrastructure CS for further processing and interpretation by the software entertainment or gaming application. After the user-related input IN is processed by the application, a response is computed and transmitted back as output OUT to the user over the high-speed data network NET. These output OUT preferably is a (downlink) data stream consisting primarily of high-definition video and audio. Additional data such as text, three-dimensional data, and stereoscopic three-dimensional data may also be transmitted.

This user-related input process repeats itself with a regular frequency (e.g. 30 times per second) throughout the course of the session to deliver a smooth coherent synchronized data stream to the user, typically manifested as one or more of the following: full-motion two-dimensional video, full-motion three-dimensional stereoscopic data, audio, and graphical user interface elements.

The cloud server infrastructure CS provides shared computing and storage resources for all users of the system. The system can thus support a massive number of simultaneous users who can interact with one another either in the same location on a single device, or from different locations with multiple devices. The cloud preferably is a cluster of actual servers that are connected in a self organizing form (said cloud) to distribute its performance in a dynamic and optimal way. This processing cloud needs not to provide the content as such. This can be provided by a further server or cloud (content cloud; not shown here) which represents an Online Game Catalogue providing all data for the desired games to be played by the audiences visiting the theaters. The content data is then transmitted to the processing cloud CS. After calculation these cloud servers CS send the output data OUT back to the client, i.e. to the display device D (at home or in the theater room).

In the field of games the most prominent data which have to be calculated are the visuals of the highest quality. By establishing a cloud of gaming servers CS the client has always the best performance guaranteed no matter what performance the local client is capable of. Depending on the application the service is not limited to graphics only. Any demanding process can be managed by the computing cloud CS. A preferred field of use is theater gaming. Here the small increase in lag (time lapse added due to the transport of the data forth and back) is negligible, and the demand for extreme performance makes it the best choice in terms of cost efficiency.

In summary the present invention relates to a computer-controlled video entertainment system and to a mobile input and sensor device providing user-related input data to said system. The invention provides an easy-to-handle mobile input and sensor device having direct access to an IP-based network, in particular to the Internet, for transmitting sensor signals or data derived thereof as user-related input data via the IP-based network to a remote computing device or server, preferably to a cloud of servers, which then process these input data for controlling the running entertainment program. The mobile input and sensor device can be made simple, since it is mainly designed to detect user activities and to generate sensor signals which are directly transmitted as input data to the remote computer(s) or server(s). Because of the fact that the mobile input and sensor device can directly be connected to the IP-based network (e.g. Internet) it can directly communicate with any IP-based computing device (gaming server or the like) being installed remotely and having powerful hardware and software to process the received input data. Thus there is no need to have a computer or game console being installed at the location of the user(s). This means that the users just need to have at their location (at home, in a cinema . . . ) their mobile input and sensor devices and a display device which is connected to the Internet. Thus both devices can communicate with the remote computer(s) which run(s) the entertainment program. The users need not to take care of updating and/or upgrading, but can always profit from the latest technology.

The invention, in particular the cloud being described here, can be used in all fields of providing interactive entertainment applications or content and also of providing non-interactive content. The invention can support Internet applications via any networks and/or media, including WiFi (Wireless Fidelity), BPL (broadband power line), LAN, WiMax (Worldwide Interoperability for Microwave Access) or any other standard technology. The mobile device of the present invention can operate to receive all kinds of interactive, non-interactive applications, such as movies and music, streamed from the cloud.

What is claimed is:

1. A mobile input and sensor device for a computer controlled video system, the computer-controlled video system comprising a display device for displaying video pictures to at least one user and at least one remote computing device executing a software application for providing output data to be transmitted via a network to the display device to display the video pictures, wherein the mobile input and sensor device is wirelessly linked to the at least one remote computing device, the mobile input and sensor device comprising:

a sensor module including at least one optical sensory element being directed towards the user, configured to detect user activities and produce sensor signals;

at least one input element;

at least one wireless interface configured to transmit user-related input data via the network to said at least one remote computing device;

a further wireless interface configured to receive further input data from external user control devices;

a processing unit configured to combine and process the further input data with said sensor signals to generate said user-related input data representing said detected user activities; and a visual projection module configured to output visual data to said at least one user as a feedback from the at least one remote computing device, wherein the mobile input and sensor device is held by the at least one user in front of said display device of the computer-controlled video system and is configured to provide the user-related input data via the network to be processed by said software application executed on the at least one remote computing device.

2. The mobile input and sensor device of claim 1, wherein said at least one optical sensory elements comprises a camera being directed towards the user, in particular the user's face, when the mobile input and sensor device being held by said user.

3. The mobile input and sensor device of claim 1, wherein said at least one input element comprises a touch panel, a keyboard, an array of keys or a key pad to be touched by the user for making user-related inputs.

4. The mobile input and sensor device of claim 1, wherein said sensor module further comprises at least one acoustic sensory element, in particular a microphone, and/or at least one thermal sensory element.

5. The mobile input and sensor device of claim 1, wherein said at least one interface of said mobile input and sensor device is at least one of the following interfaces:
a wireless network interface for an IP-based network, in particular for Internet, a wireless interface module for providing a wireless connection between said mobile input and sensor device and said at least one remote computing device being a single computing devices or a plurality of computing devices, in at least one game console, server and/or server cloud.

6. The mobile input and sensor device of claim 1, wherein said sensory elements are to detect natural user inputs such as physical gestures by said at least one optical sensory elements and/or speech by said at least one or two acoustic elements.

7. The mobile input and sensor device of claim 1, wherein said at least one optical sensory element is an optical sensor for detecting physical gestures or appearance, wherein the sensor module further includes an acoustical sensor for detecting user-produced speech, sound or noise and/or a thermal sensor for detecting physical presence or temperature.

8. The mobile input and sensor device of claim 1, wherein the processing unit provides said user-related input data to said network interface for being transmitted via said IP-based network to said at least one computing device.

9. The mobile input and sensor device of claim 1, wherein said processing unit receives from said sensor module the sensor signals and generates input data which represent said sensor signals.

10. The mobile input and sensor device of claim 1, wherein said processing unit receives from said sensor module the sensor signals and preprocesses these signals to generate said input data, in particular by applying signal and/or data recognition to generate input data which represent recognized user-related input patterns, in particular gestures and/or speech commands.

11. The mobile input and sensor device of claim 1, wherein said processing unit receives sensor signals which relate to a plurality of users and processes these signals to generate collective input data, in particular by applying signal and/or data recognition to generate collective input data which represent recognized multi-user or user-group-related input patterns, in particular collective gestures and/or collective speech commands.

12. The mobile input and sensor device of claim 1, wherein said further wireless interface is configured to receive the further input data from at least one of gamepads, joysticks, keypads, and keyboards.

13. The mobile input and sensor device of claim 1, wherein said mobile input and sensor device is a built-in device being installed in a mobile communications device.

14. A mobile communications device comprising a display device configured to display video pictures to at least one user and a mobile input and sensor device for a computer-controlled video system, the computer-controlled video system comprising at least one remote computing device executing a software application for providing output data to be transmitted via a network to the display device to display the video pictures, wherein the mobile input and sensor device is wirelessly linked to the at least one remote computing device, the mobile input and sensor device comprising:
a touch panel being integrated in said display device;
a sensor module including at least one optical sensory element being directed towards the user, configured to detect user activities and produce sensor signals;
at least one input element;
at least one wireless interface configured to transmit user-related input data via the network to said at least one remote computing device;
a further wireless interface configured to receive further input data from external user control devices;
a processing configured to combine and process the further input data with said sensor signals to generate said user-related input data representing said detected user activities; and
a visual projection module configured to output visual data to said at least one user as a feedback from the at least one remote computing device,
wherein the mobile input and sensor device is configured to provide the user-related input data via the network to be processed by said software application executed on the at least one remote computing device.

15. A computer-controlled video system, the system comprising:
a display device configured to display video pictures to at least one user;
at least one remote computing device, in particular at least one server, being installed remotely from said display device and executing a software application for providing output data to be transmitted via an IP-based network to the display device to display the video pictures; and
a mobile input and sensor device being held by the at least one user in front of said display device and wirelessly linked to the at least one remote computing device and configured to provide user-related input data via the IP-based network to be processed by said software application executed on the at least one remote computing device, wherein the mobile input and sensor device comprises:
a sensor module including at least one optical sensory element being directed towards the user, configured to detect user activities and produce sensor signals,
at least one input element,
at least one wireless interface configured to transmit the user-related input data via the IP-based network to said at least one remote computing device,
a further wireless interface configured to receive further input data from external user control devices,
a processing unit configured to combine and process the further input data with said signals to generate said user-related input data representing said detected user activities, and
a visual projection module configured to output visual data to said at least one user as a feedback from the at least one remote computing device.

16. The computer-controlled video system of claim 15, wherein the at least one remote computing device is constituted by a plurality of remotely installed computing servers being linked to each other to form a cluster or cloud of computing servers to form an overall cloud.

17. The computer-controlled video system of claim 16, wherein the computing servers are linked to each other via said IP-based network.

18. The computer-controlled video system of claim 15, wherein said IP-based network is constituted by Internet.

19. The computer-controlled video system of claim 15, wherein said network interface of said mobile input and sensor device is a wireless Internet module.

20. The computer-controlled video system of claim 15, wherein said sensor module is for detecting user activities, in particular natural user inputs such as physical gestures and/or speech.

21. The computer-controlled video system of claim 15, wherein the processing unit provides said user-related input data to said network interface for being transmitted via said IP-based network to said at least one computing device.

22. The computer-controlled video system of claim 15, wherein said at least one optical sensor element is an optical sensor for detecting physical gestures or appearance, the sensor module further including an acoustical sensor for detecting user-produced speech, sound or noise and/or a thermal sensor for detecting physical condition by temperature.

23. The computer-controlled video system of claim 15, wherein said processing unit receives from said sensor module the sensor signals and generates raw input data which represent said sensor signals.

24. The computer-controlled video system of claim 15, wherein said processing unit receives from said sensor module the sensor signals and pre-processes these signals to generate said input data, in particular by applying signal and/or data recognition to generate input data which represent recognized user-related input patterns, in particular gestures and/or speech commands.

25. The computer-controlled video system of claim 15, wherein said processing unit receives sensor signals which relate to a plurality of users and processes these signals to generate collective input data, in particular by applying signal and/or data recognition to generate collective input data which represent recognized multi-user or user-group-related input patterns, in particular collective gestures and/or collective speech commands.

26. The computer-controlled video system of claim 15, wherein the visual projection module of the mobile input and sensor device is configured to output a laser-based projection allowing user activities.

27. The computer-controlled video system of claim 15, wherein said further wireless interface is configured to receive the further input data from at least one of gamepads, joysticks, keypads, and keyboards.

* * * * *